April 5, 1966 K. G. MICHEL ET AL 3,244,788
METHOD FOR FORMING PLASTIC ARTICLES
Filed Nov. 8, 1962 7 Sheets-Sheet 1
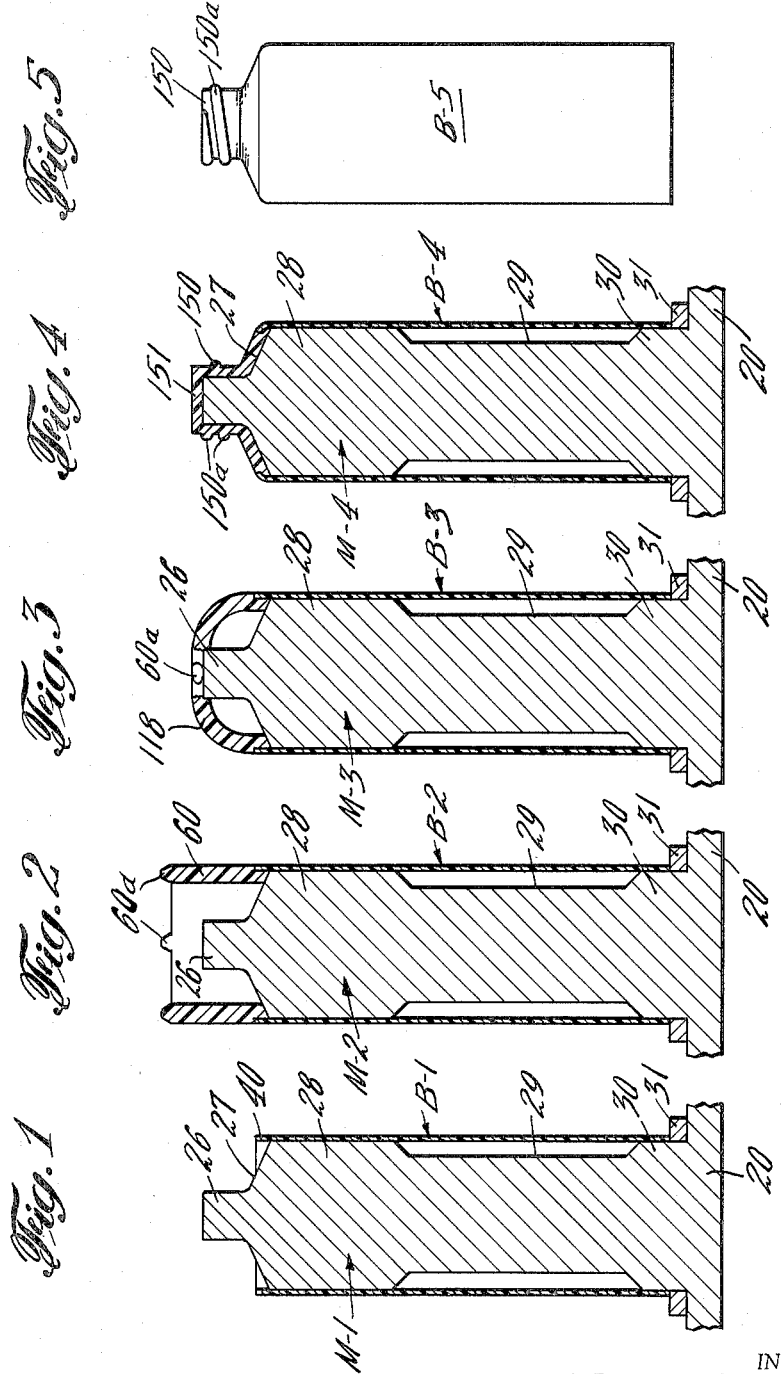
INVENTORS
KENNETH GEORGE MICHEL
ERIC PAUL TUNKE
BY
ATTORNEYS

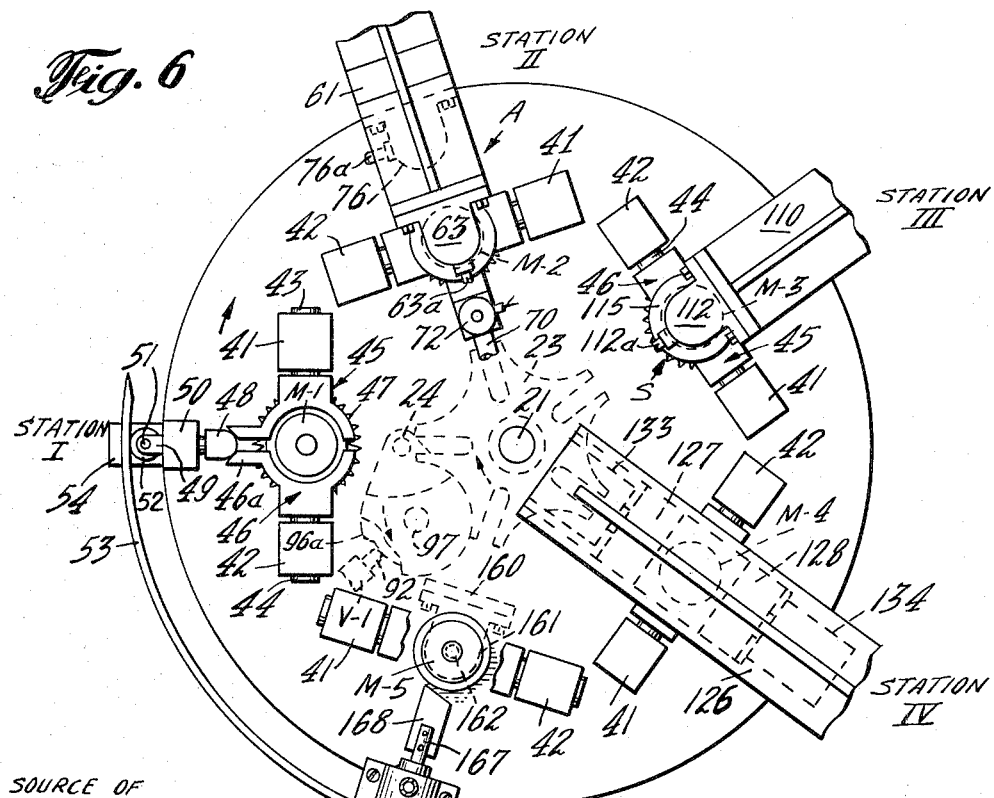

April 5, 1966 K. G. MICHEL ET AL 3,244,788
METHOD FOR FORMING PLASTIC ARTICLES
Filed Nov. 8, 1962 7 Sheets-Sheet 3

INVENTORS
KENNETH GEORGE MICHEL
ERIC PAUL TUNKE
BY Bertram F. Claeboe
George W. Reiber
ATTORNEYS

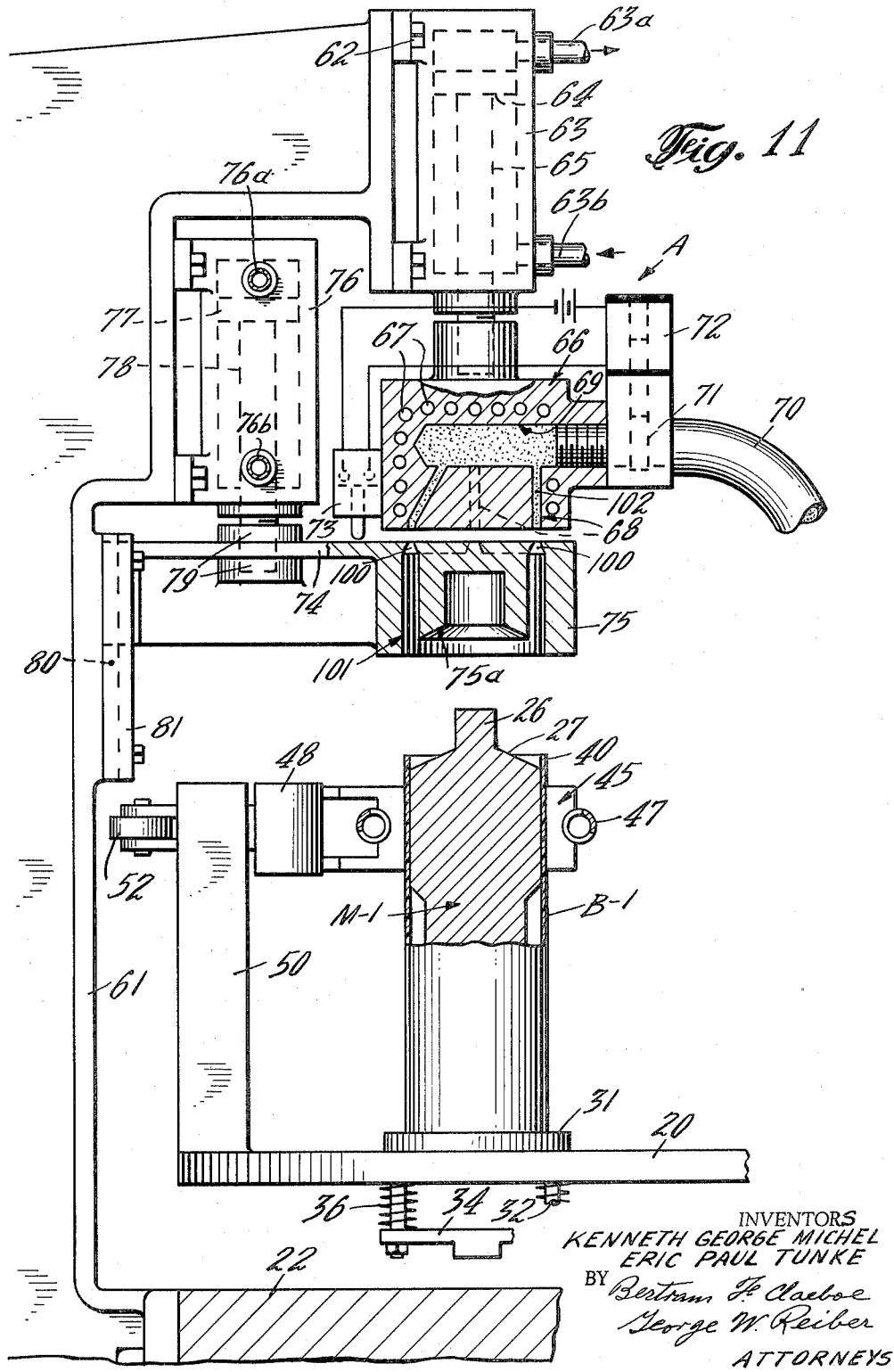

April 5, 1966
K. G. MICHEL ET AL
3,244,788
METHOD FOR FORMING PLASTIC ARTICLES
Filed Nov. 8, 1962
7 Sheets-Sheet 5
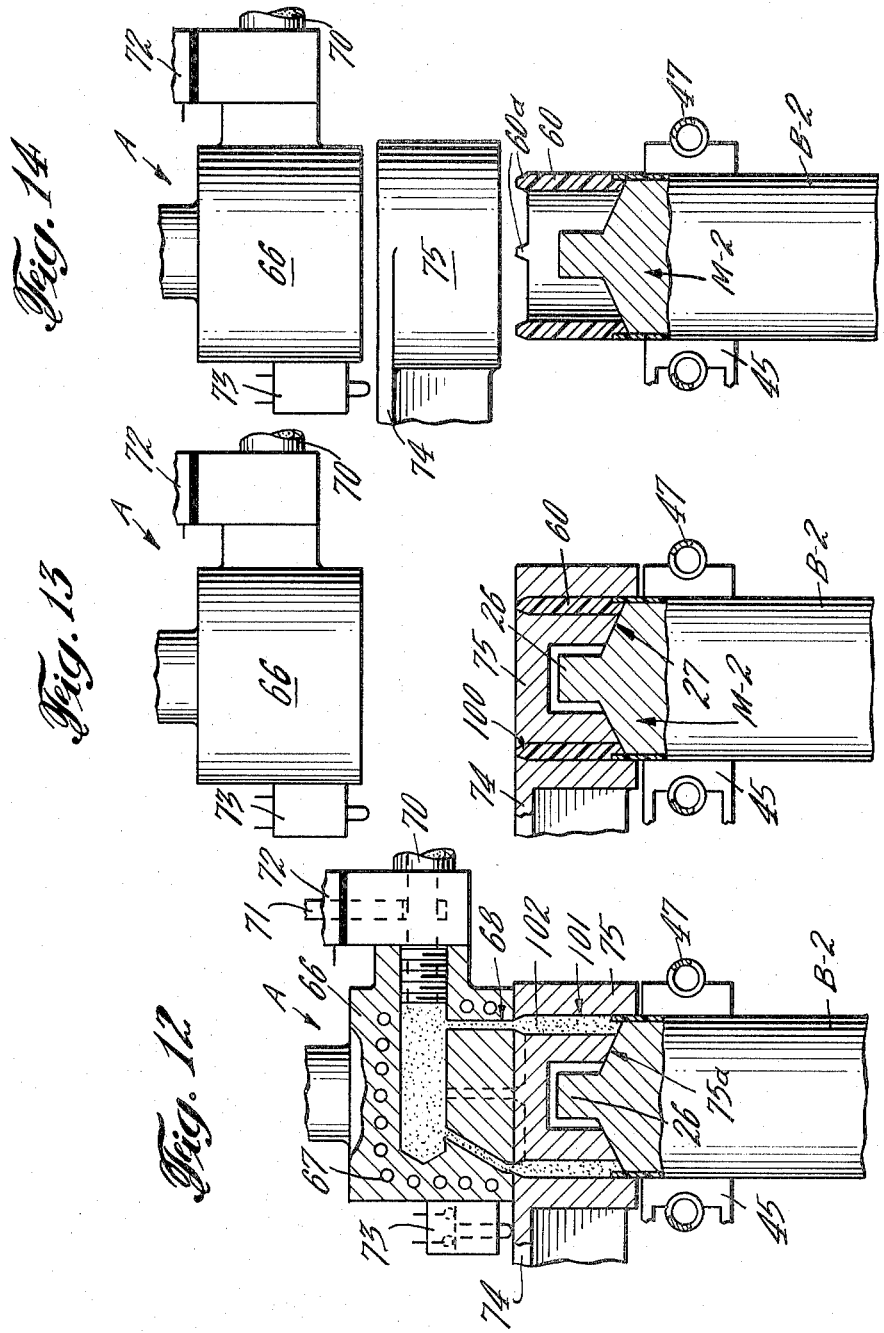
INVENTORS
KENNETH GEORGE MICHEL
ERIC PAUL TUNKE
BY Bertram F. Claeboe
George W. Reiber
ATTORNEYS April 5, 1966 K. G. MICHEL ET AL 3,244,788
METHOD FOR FORMING PLASTIC ARTICLES
Filed Nov. 8, 1962 7 Sheets-Sheet 6

INVENTORS
KENNETH GEORGE MICHEL
ERIC PAUL TUNKE
BY
ATTORNEYS

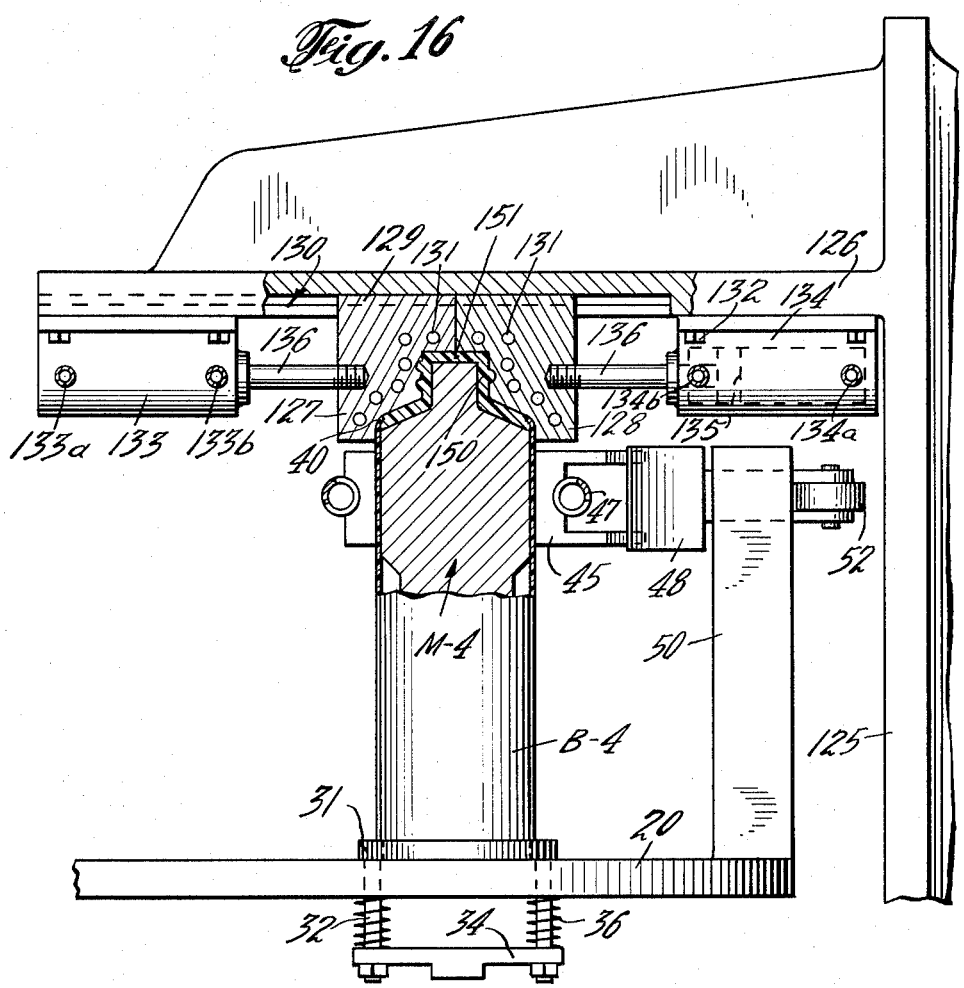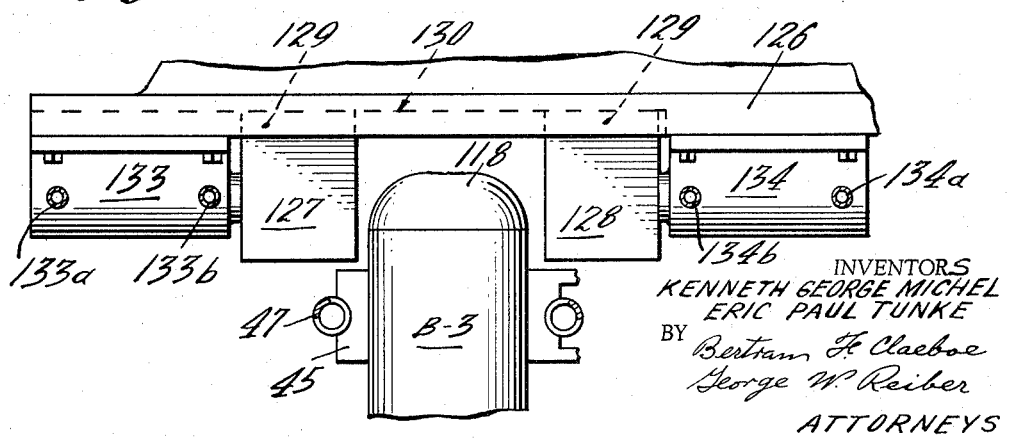

United States Patent Office 3,244,788
Patented Apr. 5, 1966

3,244,788
METHOD FOR FORMING PLASTIC ARTICLES
Kenneth George Michel, Far Hills, N.J., and Eric Paul Tunke, Hicksville, N.Y., assignors to American Can Company, New York, N.Y., a corporation of New Jersey
Filed Nov. 8, 1962, Ser. No. 236,222
2 Claims. (Cl. 264—267)

The present invention relates broadly to the production of thermoplastic containers, and is more particularly concerned with the formation of a tubular thermoplastic container with integral head portion thereon featuring the steps of welding a plastic body of the requisite mass to one end of a tubular member and shaping the body to the final head configuration.

It is an important aim of the present invention to provide a container forming method productive of high quality articles and utilizing relatively low cost tooling operable at substantial production speeds.

Another object of this invention lies in a method of using a molding apparatus indexable through a plurality of stations whereat there is sequentially performed fusion of a thermoplastic collar to one end of a tubular member, die forming of the collar to provide a shaped head portion on the tubular member, and removal of any flash followed immediately by ejection of the finished workpiece.

A further object of this invention is to provide a process of forming tubular containers in which a tubular sleeve of relatively greater wall thickness than a tubular body is welded thereto along the inner diameter of the body at one end thereof, and the sleeve die formed with the application of additional heat to provide a shaped head portion on the body.

A still further object of the instant invention lies in a method of using a container forming apparatus including an indexable table mounting a plurality of circumferentially spaced mandrels thereon each receiving a thermoplastic tubular body, the bodies being maintained on said mandrels by a clamping arrangement embodying a minimum number of parts resiliently held in closed position and cam actuated to an open position during loading and unloading.

An even further object of this invention is a method of using molding apparatus of the foregoing character in which the tubular bodies have injection molded thereon a thermoplastic sleeve which is successively preliminarily formed to a generally dome-like configuration, next formed to the final head configuration desired, and thereafter trimmed as required, each of the named steps being performed in rapid succession and while the tubular bodies are clampingly restrained upon the mandrels.

Other objects and advantages of the invention will become more apparent as the description proceeds, particularly when taken in connection with the accompanying drawings.

In the drawings, wherein like numerals are employed to designate like parts throughout the same:

FIGURES 1 to 5 are essentially diagrammatic views portraying an exemplary sequence of steps in practice of the present invention;

FIGURE 6 is a plan view illustrating a typical arrangement of stations at which the steps of FIGURES 1 to 5 may be performed;

FIGURE 7 is a schematic diagram of a cam-actuated pneumatic system which may be employed to operate the molds and other structure at the stations shown;

FIGURE 8 is a sectional view of one type of valve which can be used in the system of FIGURE 7;

FIGURE 11 is a side elevational view, portions thereof being taken in section, illustrating molding apparatus for providing a tubular sleeve on the tube body;

FIGURES 12 to 14 are fragmentary views taken partly in section and partly in elevation showing operation of the molding apparatus of FIGURE 11;

FIGURE 16 is a sectional view through typical structure effective to shape the preliminarily formed sleeve to a head configuration;

FIGURE 17 is a fragmentary elevational view of the dies of FIGURE 16 and the actuating means therefor.

Figure 9:
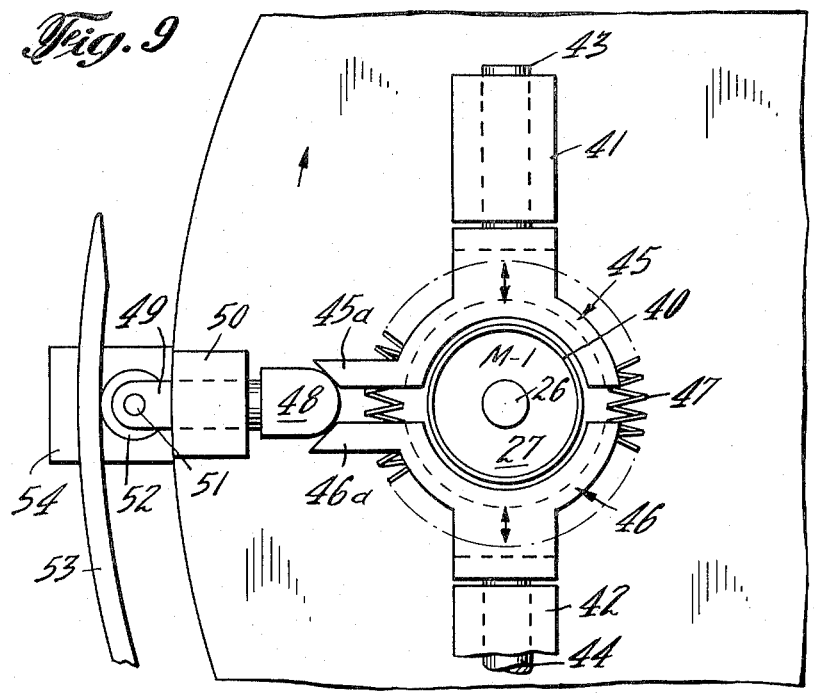
FIGURE 9 is a plan view of exemplary clamping means for maintaining the tubular bodies on the mandrels during performance of the container forming steps.

Referring now first to FIGURES 1, 6, 9 and 10 of the drawings, a horizontally disposed table 20 is centrally connected to shaft means 21 journalled for rotation in base frame 22, the shaft means rigidly mounting a Geneva wheel 23 disposed on the underside of the table and being intermittently engaged by drive means 24 to index the table 20 through Stations I, II, III, IV and V for performance thereat of the respective operations of loading and locking, molding preliminary forming, final forming, and ejecting or unloading. As will be brought out hereinafter, it is within the contemplation of this invention that pre-forming may be eliminated by molding initially a semi-finished headpiece, and that trimming of flash at the ejection station may not at all times be practiced. Further, prior to unloading, the finished tube body may be capped and/or decorated.

Disposed in upright relation at circumferentially spaced locations upon the table 20, and being integral therewith or in suitable fashion made rigid thereto, is a plurality of mandrels M-1 to 5 of which five are shown in the illustrative embodiment. Each mandrel is shaped to include a relatively slender neck portion 26 upstanding upon a sloping shoulder portion 27 formed upon body portion 28 which may be reduced in diameter at 29 upwardly of base portion 30. Encircling each mandrel base and seated upon the table 20 at the first four work stations is a ring member 31 which has welded or otherwise secured thereto a plurality of bolt means 32 passing through openings in the table 20 and connected by nut means 33 to a plate member 34 provided with a central embossment 35. Spring means 36 encircle the bolt means and bear at their opposite ends against the lower surface of the table and against the plate member 34 to maintain the annulus 31 in flush fitting contact with the upper surface of the table. However, as will be later noted in connection with a description of Station V, the annular 31 functions effectively when the embossment 35 is contacted by ejector means to unload or strip the finished tube or container from mandrel M–5.

Continuing with reference to FIGURES 1, 6, 9 and 10, an operator at Station I slides a thermoplastic tubular body B–1 upon the mandrel M–1 until it bottoms upon the ring member 31 surrounding the mandrel base. The body B–1 may be produced by conventional extrusion techniques employing as the material a polyolefin such as low or high density polyethylene, and the respective lengths of the mandrel and tube body are predetermined so that the upper end of the body extends beyond or above the mandrel shoulder to provide an extension or overhang 40. This extended portion of the body provides along the inner diameter thereof an effective band area for achievement of a bond with the head material which is highly resistant to fracture through rotational twisting, flexure and the like.

Figure 10:
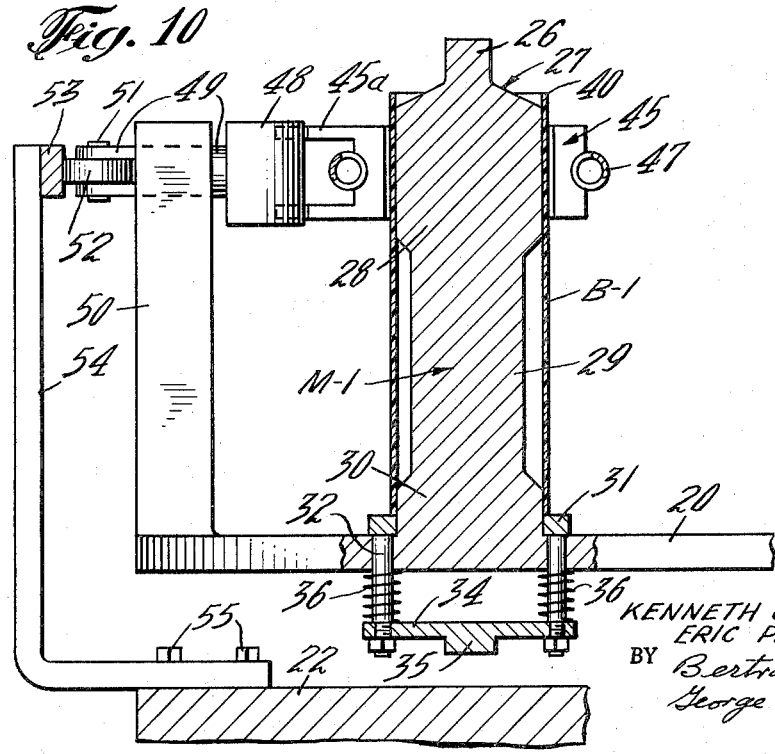
FIGURE 10 is a side elevational view, with parts thereof in section, showing a typical cam arrangement for actuating the clamping device of FIGURE 9.

Each tubular body B is maintained upon its respective mandrel M as the table indexes from Station I through successive stations by means of the clamping arrangement best shown in FIGURES 6, 9 and 10. The table 20 at circumferentially spaced locations therealong rigidly supports a pair of spaced upright members 41 and 42 which are passaged adjacent their upper ends to slidably receive shank portions 43 and 44, respectively, on semi-cylindrical clamping members 45 and 46. Each of the latter members is externally grooved to receive resilient means 47 in encircling relation therewith, and it may further be observed from FIGURES 9 and 10 that each clamping member is equipped with a bifurcated arm portion 45a and 46a which bears against a cam member 48 supported by a shaft member 49 passing through an upright 50 rigidly connected to the horizontal table 20.

The shaft member 49 is bifurcated at its opposite end to mount by pin means 51 a roller 52 which rides along cam track 53 supported at the upper end of a bracket member 54 connected at 55 to the main frame 22. It is to be seen from FIGURE 6 that the cam track 53 extends in a generally arcuate path from Station V to Station I, and the function of the track in combination with the roller 52 and structure connected thereto is to spread the clamp arm portions 45a and 46a in opposition to the spring means 47 to release the clamping action on the tube body B and permit loading and unloading of the mandrels M at Stations I and V, respectively. As appears also from FIGURE 6, a clamping arrangement of the character generally indicated at 45 and 46 is provided at each of the five work stations, and of course, as the table 20 rotates past the cam track 53 and through Stations II, III and IV and approaches Station V, the tube body B is clampingly held against the mandrel M.

Under action of the Geneva mechanism 23–24 the table is indexed to transfer the clamped tube body B–1 on mandrel M–1 to Station II, whereat a tubular thermoplastic sleeve 60 of predetermined mass is bonded to the portion 40 of the tube body extending beyond the shoulder 27 on the mandrel. Molding apparatus effective for this purpose is shown in detail in FIGURES 11 to 14, wherein the legend A has been applied generally thereto.

As appears, a vertical support member 61 erected from the base frame 22 mounts at its upper end by fastening means 62 a cylinder 63 slidably receiving therein a piston 64 connecting with a rod member 65 which is threaded or otherwise affixed to a vertically movable injection nozzle 66. The nozzle member is suitably heated as at 67, and interiorly thereof is provided with a plurality of generally vertically directed passages 68 which communicate with a horizontally disposed main passage 69 receiving thermoplastic material from a supply conduit 70 under control of valve means 71 actuated by solenoid 72 electrically connected to switch means 73 which in turn is actuated when contacted by flange portion 74 on mold member 75.

The nozzle member 66 and mold member 75 preferably move vertically in unison, and the actuating means for the mold member 75 may take the form of a cylinder 76 mounted by the support member 61. Reciprocal within the cylinder 76 is a piston 77 having a rod portion 78 thereon threadably connected to an apertured embossment 79 on the flange portion 74 of the mold member 75. The flange portion 74 is suitably contoured at its opposite end for slidable movement within a guideway 80 formed within plate means 81 also mounted by the vertical support 61.

The nozzle actuating cylinder 63 and the mold actuating cylinder 76 are desirably of the pneumatic type, and each is equipped with connections thereto 63a–b and 76a–b, respectively. A suitable pneumatic system for controlling the cylinders 63 and 76 appears in FIGURE 7, to which reference is now made.

The manifold means 85 communicates through lines 86 and 87 with valve means V–1 and V–2. Each valve may be constructed substantially as is shown in FIGURE 8, and includes a valve body 90 having a bore 91 therethrough slidably receiving a valve stem 92 provided with a reduced diameter central portion 93 connecting its opposite end portions 94a and 94b. The valve stem 93 is slidable within the bore 91 under action of spring means 95 which is opposed by cam means 96a mounted by shaft means 97, as appears in FIGURE 7.

The valve body 90 is also suitably passaged to receive the connections 63a–b from the actuator means 63 and also to receive the connection 86 from the manifold 85. It is believed now quite clear that rotation of the cam member 96a to present its rising surface of the valve stem end portion 94a closes the port to the connector 63b so as to communicate the connection 86 with the line 63a leading to the face of the nozzle actuating piston 64. In a like fashion movement of cam 96b controlling action of the valve b–2 ports fluid to the face of the mold actuating piston 77, whereby the nozzle member 66 and mold member 75 proceed downwardly essentially in unison to the position shown in FIGURE 12. In this regard, it is to be noted that the nozzle and mold members 66 and 75 are then in flush fitting contact, and that the switch means 73 is thereby actuated to permit the flow of thermoplastic material from the supply conduit 70 into the injector passages 68 and 69. Also in this same position of FIGURE 12 the mold member 75 is seated upon the mandrel M–2 with sloping surfaces 75a of the mold cavity in abutment with the shoulder portion 27 on the mandrel M–2. The extent of movement of the mold member 75 into surrounding contact with the upper end of the mandrel is of course controlled by the length of the stroke of the piston rod 78 and/or the length of the guideway 80.

The mold member 75 at its upper end is provided with a plurality of circumferentially spaced openings 100 oriented to register with the passages 68 in the nozzle member 66 when the members 66 and 75 are in abutment in the manner of FIGURE 12. The openings 100 communicate with an annular passage 101 in the mold member 75, and when the nozzle member 66 and mold 75 are in their downward positions and the switch means 73 thereby actuated to open the gate valve 71, molten thermoplastic material 102 flows downwardly through the passages 68, into the openings 100, to thereby fill the annulus 101. The mold member 75 may be equipped with selectively operated heating and cooling means (not shown), and when the thermoplastic material in the annular cavity 101 has cooled sufficiently, the nozzle member 66 is first raised by the actuating means 63 as the cam member 96a rotates to remove its rising surface from contact with the valve stem 92.

This relative position of the parts during this portion of the molding cycle is shown in FIGURE 13. Thereafter, when a sufficient bond between the tubular sleeve 60 and extension 40 on the tube body B–2 is achieved, the mold member 75 is also raised, as shown in FIGURE 14, by action of the cam means 96b, valve means V–2 and actuating means 76 in the manner described with reference to the nozzle actuator 63.

The tube body B–2 as produced by the apparatus of FIGURES 11 to 14 may be seen to embody at its upper end protuberances 60a which result from thermoplastic material having cooled within the entry openings 100 within the mold members 75. Of course, by suitable variations in mold design these protuberances may be eliminated.

However, in the subsequent steps of the process now to be described the protuberances 60a are shaped or molded so as to be a merged and thereby invisible part of the ultimate headpiece. The next step in the process is accomplished at Station III, whereto the tube body and associated mandrel are indexed under action of the Geneva mechanism 23–24. As was pointed out earlier in certain instances Station III may be eliminated by suitable variations in the molding apparatus at Station II so as to form at this station an extension on the tube body which resembles more a preliminarily formed or rough counterpart of the finished head portion on the tube.

Figure 15:
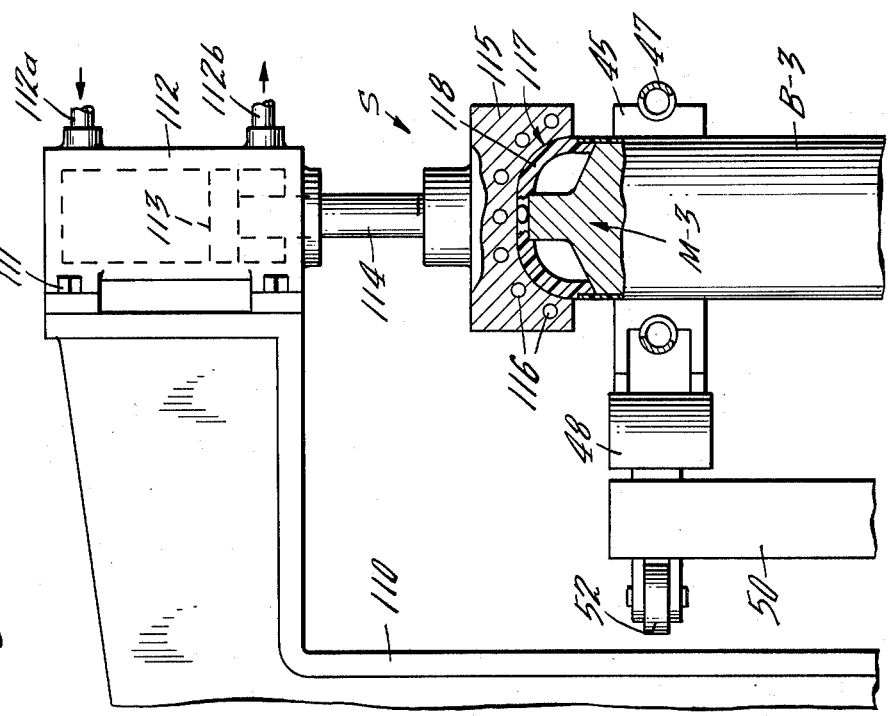
FIGURE 15 is an elevational view of exemplary apparatus for preliminarily forming the tubular sleeve, certain details of the apparatus being shown in section.

The apparatus disclosed at Station III is illustrated in detail in FIGURE 15 and is designated therein generally by the legend S. As was provided at the molding station, the preliminary forming apparatus S includes an upstanding support member 110 erected from the main frame (not shown), the support mounting by fastening means 111, actuating means 112 receiving therein for vertical reciprocation piston means 113 having a rod portion 114 threaded or otherwise connected to mold member 115. The member 115 is equipped with suitable heating means, indicated at 116, and defined within the mold member is a generally concave cavity 117 effective to fold downwardly and inwardly the tube sleeve portion 60 so as to provide a generally domelike portion 118 on the tube body B–3.

The actuator 112 for the head shaping member 115 is actuated substantially in the same manner as was earlier described in connection with the nozzle and mold members 63 and 75 of FIGURE 11. That is to say, cam means 96c (FIGURE 7) upon rotation of the cam shaft 97 to present the rising cam surface to the valve stem 92 ports fluid from branch line 88 through actuator line 112a to the backside of the piston 113 to lower the mold member 115 to the shaping position of FIGURE 15. Conversely, when the preliminary shaping step of FIGURE 15 is completed, the cam means 96c operating in timed sequence advances so that its rising surface is off the valve stem 92, and the valve spring 95 is thereby effective to restore the valve V–3 to the position of FIGURE 8, resulting in the mold member 115 being raised to an inactive position.

In continuance of the novel process steps of this invention, the tubular body B–3 with pre-formed head portion 118 thereon is indexed from the apparatus of FIGURE 15 at Station III to Station IV, the details of which are fully illustrated in FIGURES 16 and 17. At this station, a vertical support member 125 erected from the main frame mounts on arm portion 126 thereof a pair of female die members 127 and 128 which are horizontally slidable between open and closed positions by provision of cooperating slide portions 129 and slideways 130. The die members 127 and 128 may be internally heated as at 131, although if the tube body B–3 is transferred with sufficient rapidity from Station III, sufficient heat may be retained in the preliminarily formed head portion 118 to permit its shaping to the final head configuration without the addition of heat by the means 131.

Also mounted upon the support arm portion 126 by fastening means 132 is a pair of actuator members 133 and 134 serving the die members 127 and 128, respectively. Horizontally reciprocal within the actuators are piston means 135 each connecting with a rod member 136 threaded or otherwise secured to the die members 127 and 128.

Reciprocation of the pistons 135 to open the die members 127 and 128 is effected by branch connections 133b and 134b communicating with a line 140b leading to valve means V–4 actuated by cam means 96d. Conversely, the die members 127 and 128 are caused to move to a closed position by fluid pressure applied to the backside of the pistons 135 through branch connections 133a and 134a communicating through line 140a with the valve means V–4.

The valve means V–4 normally ports fluid from the supply line 140 through the connector 140b to maintain the die members 127 and 128 in an open position. The tube body B–3 as it indexes from Station III to Station IV passes between the open die members 127 and 128 in the manner shown in FIGURE 17. When centrally positioned therebetween the tube body and particularly the pre-formed head portion 118 thereof is shaped by the closing action of the die members, which are actuated to a closed position by the rising surface on the cam 96d moving the valve stem 92 so that fluid from the line 140 is discharged through the line 140a through the branch connections 133a and 134a.

The die members 127 and 128 are of course internally configured to the ultimate head configuration desired, which in the illustrative shape shown includes an upstanding neck portion 150 externally threaded at 150a, the entry to the passaged neck portion being closed by a transverse wall, which is removed in a subsequent step. It is thus to be seen from a comparison of FIGURES 15 and 16 that the die members 127 and 128 move the head material 118 of the body B–3 downwardly into closed fitting contact with the mandrel shoulder portion 127 and also against the outer diameter of the mandrel neck portion 26. Further, the pre-formed head material is forced by the die members 127 and 128 in a generally radial direction upon the top surface of the neck portion and within the mold cavity defined thereabove producing the transverse wall 151 and an essentially formed tube structure indicated in the drawings by the legend B–4.

After the tube body B–4 has had formed thereon a head member substantially in the manner described in connection with FIGURES 16 and 17, the tube body and supporting mandrel M–4 are advanced by rotation of the indexable table 20 to Station V, whereat the tube body is removed from the mandrel support. This removal may be effected by hand after release of the clamping mechanism 45–46, although preferably the ejection is effected by mechanical means and follows removal of the transverse wall or flash 151 by trimming means. Also, as was pointed out hereinafter, there may be performed on the table 20 prior to the ejection such finishing operations as decorating, capping and the like.

In accordance with this invention, the final station, identified as Station V, provides the location for accomplishment of trimming and mechanical ejection of the finished tube body. Apparatus for this purpose is portrayed in FIGURES 6, 7 and 18, and it may be observed therefrom that at this station the main frame 22 mounts bracket means 160 supporting actuating means 161, which may take the form of a pneumatic cylinder generally of the type earlier described and having a plunger or ejector member 162 vertically movable within an opening 22a provided in the base frame 22.

At this same station and suitably also supported by the main frame, as by bracket means 165 is an actuator 166, again which may have the construction of the cylinders earlier described in connection with the preceding views. The actuator 166 has outwardly extending therefrom a rod member 167 mounting severing means 168, the rod member 167 being actuated in opposite directions through piston movement under control of fluid connections 170a–b connecting valve means V–5 with the actuator 166.

The valve V–5 is under control of a supply line 175 communicating with the manifold 85, the stem portion of the valve V–5 being movable to port fluid through the line 170a by rotation of cam means 96e as the rising surface thereof rotates to an actuating position.

In a like manner, the actuator means 161 controlling the ejector pin 162 has fluid connections 161a and 161b leading thereto which connect with valve means V–6, in turn operated by rotary cam 96f. As appears, the valve connects with the manifold 85 through connection 185.

Figure 18:
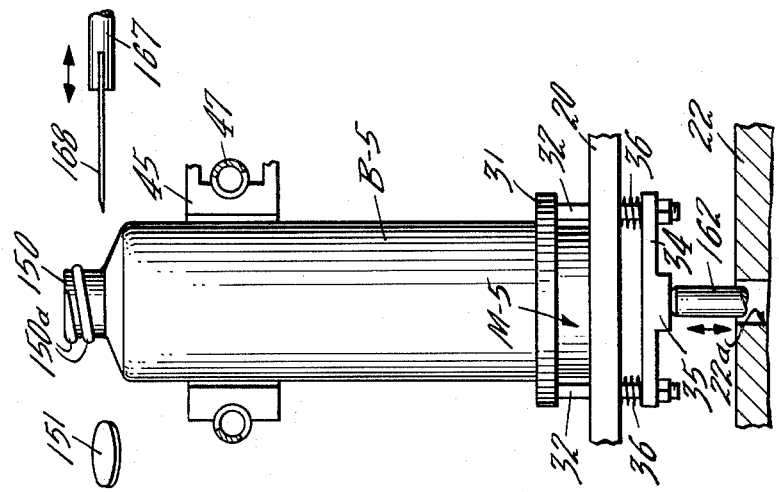
FIGURE 18 is a side elevational view of a final station in the method, showing the trimming and ejection steps.

It is thus believed now apparent that as the table with mandrel M–4 and tube body B–4 thereon rotates into Station V, the rotary cam 96e in timed sequence causes the knife member 168 to be thrust forward severing the top or transverse wall 151 from the tube body in essentially the fashion shown in FIGURE 18. Immediately thereafter, the roller member 52 associated with the clamping mechanism 45-46 engages the cam track 53, spreading the clamping members in opposition to the resilient force of the spring 47 (FIGURES 9 and 10), thereby releasing the tube body B-5 from clamped engagement with the mandrel M-5. Essentially simultaneously, and also in timed sequence, the rotary cam 96f, operating upon the valve V-6 and actuator 161, causes the ejector pin 162 to contact the embossment 35 on the plate member 34. This results in the bolt means 32 and ring member 31 being raised in unison in opposition to the spring 36, thereby lifting or forcibly ejecting the container B-5 from the mandrel M-4. The container can then be lifted by hand from the mandrel, or if desired, may be fully ejected by use of an air blast.

It is to be seen from the foregoing that applicants have provided a novel method and apparatus for rapidly fusing an embryonic end member and thereafter forming said end member into a headpiece of the final configuration desired upon a preformed tube body utilizing minimum equipment and effecting a conservation of raw materials, while still achieving a bond between the headpiece and tube body which is essentially indestructible. The equipment illustrated is readily automated and the series of steps illustrated are performed in a timed sequence which assures continued accuracy of results with minimum personnel.

Modifications of the apparatus shown have been pointed out herein, and these and other changes can of course be effected without departing from the novel concepts of this invention.

We claim:
1. A method of producing a tubular thermoplastic container, which comprises locating a preformed tubular thermoplastic body upon a forming mandrel having a reduced end face with one end of said body spaced from said end face, inserting said end face and said body end as a unit into a first die to seal the open end of the die, flowing a molten charge of thermoplastic material into said die and in contact with said end face and the inner circumferential wall of said body to mold and fuse an embryonic tubular end member to said body end, and transferring said body with fused embryonic end member thereon to a succession of at least two more dies to first shape said embryonic end member into a preliminary form of a finished head member and then into the desired finished configuration.

2. A method of producing a tubular thermoplastic container, which comprises introducing into a tubular thermoplastic body a forming member positioned with respects thereto so that an end face of said member is located a predetermined distance within an end of said body, inserting said forming member and body into an open die, introducing a molten charge of thermoplastic material into said die and in contact with said end face of said forming member and the inner circumferential wall of said body, cooling said charge to provide an embryonic tubular end member having a wall thickness greater than said body in fused relation with said inner body wall, transferring said body and fused end member into a second die to heat and shape said embryonic end member into a preliminary dome-like configuration, and then shaping said end member into contoured conformity with said end face of said forming member to provide the desired finished configuration.

References Cited by the Examiner

UNITED STATES PATENTS

| | | |
|---|---|---|
| Re. 25,313 | 1/1963 | Walker. |
| 2,129,839 | 9/1938 | Henderson. |
| 2,386,498 | 10/1945 | Ostrander. |
| 2,396,635 | 3/1946 | Bogoslowsky. |
| 3,047,910 | 8/1962 | Downs. |
| 3,095,259 | 6/1963 | Smith _____ 264—248 |
| 3,100,172 | 8/1963 | Nier _____ 264—248 |
| 3,100,913 | 8/1963 | Matteo _____ 18—20 |
| 3,102,304 | 9/1963 | Divers _____ 18—20 |

ROBERT F. WHITE, *Primary Examiner.*

ALEXANDER H. BRODMERKEL, *Examiner.*

F. MARLOWE, L. S. SQUIRES, *Assistant Examiners.*